United States Patent
Lee et al.

(10) Patent No.: US 10,506,649 B2
(45) Date of Patent: Dec. 10, 2019

(54) METHOD, CARRIED OUT BY TERMINAL, FOR TRANSMITTING PSBCH IN WIRELESS COMMUNICATION SYSTEM AND TERMINAL UTILIZING THE METHOD

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 173 days.

(21) Appl. No.: 15/565,280

(22) PCT Filed: Apr. 11, 2016

(86) PCT No.: PCT/KR2016/003801
§ 371 (c)(1),
(2) Date: Oct. 9, 2017

(87) PCT Pub. No.: WO2016/163856
PCT Pub. Date: Oct. 13, 2016

(65) Prior Publication Data
US 2018/0077746 A1 Mar. 15, 2018

Related U.S. Application Data

(60) Provisional application No. 62/146,146, filed on Apr. 10, 2015, provisional application No. 62/150,284, (Continued)

(51) Int. Cl.
*H04W 76/14* (2018.01)
*H04L 1/18* (2006.01)
(Continued)

(52) U.S. Cl.
CPC .......... *H04W 76/14* (2018.02); *H04L 1/00* (2013.01); *H04L 1/18* (2013.01); *H04L 5/00* (2013.01);
(Continued)

(58) Field of Classification Search
CPC ... H04W 8/005; H04W 56/001; H04W 72/08; H04W 76/14; H04W 88/04
See application file for complete search history.

(56) References Cited

U.S. PATENT DOCUMENTS

2014/0112233 A1 4/2014 Bodas et al.
2014/0335853 A1 11/2014 Sartori et al.
(Continued)

FOREIGN PATENT DOCUMENTS

WO 2015-044367 A1 4/2015

OTHER PUBLICATIONS

"3rd Generation Partnership Project;Technical Specification Group Radio Access Network; Evolved Universal Terrestrial Radio Access (E-UTRA);Radio Resource Control (RRC); Protocol specification" 3GPP TS 36.331 V12.5.0 (Mar. 27, 2015); pp. 152-157; Figures 5.10.7.1-2.
(Continued)

*Primary Examiner* — Rhonda L Murphy
(74) *Attorney, Agent, or Firm* — Dentons US LLP

(57) ABSTRACT

Provided are a method, carried out by a terminal, for transmitting a physical sidelink broadcast channel (PSBCH) and a terminal utilizing the method. The method determines whether the terminal is in or out of cell coverage, and whether a discovery signal to be transmitted by the terminal is a public safety (PS) discovery signal for PS. If the terminal is outside the cell coverage and is to transmit a PS discovery
(Continued)

signal, then when a sidelink synchronization signal (SLSS) is transmitted in a discovery period, a PSBCH is also transmitted therewith.

8 Claims, 16 Drawing Sheets

Related U.S. Application Data filed on Apr. 21, 2015, provisional application No. 62/154,734, filed on Apr. 30, 2015, provisional application No. 62/162,654, filed on May 15, 2015, provisional application No. 62/233,302, filed on Sep. 25, 2015.

(51) Int. Cl.
| | |
|---|---|
| H04L 5/00 | (2006.01) |
| H04L 27/10 | (2006.01) |
| H04W 56/00 | (2009.01) |
| H04W 72/08 | (2009.01) |
| H04W 88/04 | (2009.01) |
| H04W 8/00 | (2009.01) |
| H04L 1/00 | (2006.01) |
| H04L 27/26 | (2006.01) |
| H04W 72/04 | (2009.01) |
| H04W 48/10 | (2009.01) |

(52) U.S. Cl.
CPC .............. *H04L 27/10* (2013.01); *H04W 8/005* (2013.01); *H04W 56/001* (2013.01); *H04W 72/08* (2013.01); *H04W 88/04* (2013.01); *H04L 27/2655* (2013.01); *H04W 48/10* (2013.01); *H04W 72/0446* (2013.01)

(56) References Cited

U.S. PATENT DOCUMENTS

| 2015/0016357 A1* | 1/2015 | Yie | H04W 72/082 370/329 |
| 2015/0215903 A1* | 7/2015 | Zhao | H04W 72/04 370/329 |

OTHER PUBLICATIONS

"Qualcomm Incorporated: Revised WI: Enhanced LTE Device to Device Proximity Services"; RP-150441; 3GPP TSG RAN Meeting #67; Shanghai, China; Mar. 9-12, 2014.

"Introduction of ProSe"; Ericsson R2; R2-150717; 3GPP TSG-RAN WG2 Meeting #89 R2-150717 Athens, Greece, Feb. 10-14, 2015.

* cited by examiner (a)

(b)

METHOD, CARRIED OUT BY TERMINAL, FOR TRANSMITTING PSBCH IN WIRELESS COMMUNICATION SYSTEM AND TERMINAL UTILIZING THE METHOD

This application is a National Phase application of International Application No. PCT/KR2016/003801, filed on Apr. 11, 2016, and claims the benefit of U.S. Provisional Application No. 62/146,146, filed on Apr. 10, 2015, U.S. Provisional Application No. 62/150,284, filed on Apr. 21, 2015, U.S. Provisional Application No. 62/154,734, filed on Apr. 30, 2015, U.S. Provisional Application No. 62/162,654, filed on May 15, 2015, U.S. Provisional Application No. 62/233,302, filed on Sept. 25, 2015 and all of which are hereby incorporated by reference in their entirety for all purposes as if fully set forth herein.

BACKGROUND OF THE INVENTION

Field of the Invention

The present invention relates to a wireless communication, more particularly a method, carried out by a terminal, for transmitting a physical sidelink broadcast channel (PSBCH) in a wireless communication system and the terminal utilizing the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, D2D action includes D2D discovery and D2D communication. The D2D discovery relates to a process in which a terminal searches for another terminal, and the D2D communication relates to the data communication with the other terminal. Conventionally, when transmitting a D2D discovery signal, the terminal periodically transmits a discovery signal after transmitting the synchronization signal once. Such conventional methods may be appropriate for commercial applications, but are not appropriate for situations where more reliable discovery actions, such as public safety, are required.

Meanwhile, a sidelink process is a process of processing the received D2D signal depending on the D2D action. In view of the terminal receiving the D2D signal, the D2D signal may have various characteristics. For example, the D2D signal synchronized with a certain cell, the D2D signal for relay, and the received quality of the signal may be variously classified depending on the threshold value or the like. It is inefficient to allocate the same sidelink process uniformly for various D2D signals.

SUMMARY OF THE INVENTION

It is an object to be solved in a present invention to provide a method for transmitting a PSBCH by a terminal in a wireless communication system and the terminal using the method.

In one aspect, provided is a method for transmitting a physical sidelink broadcast channel (PSBCH) carried out by a terminal in a wireless communication system. The method includes determining whether the terminal is in or out of cell coverage and determining whether a discovery signal to be transmitted by the terminal is a public safety (PS) discovery signal for PS, and in a case that the terminal is outside the cell coverage and is to transmit a PS discovery signal, when a sidelink synchronization signal (SLSS) is transmitted in a discovery period, the PSBCH is also transmitted therewith.

The PS discovery signal may include a type 1 discovery signal transmitted by using a resource selected by the terminal itself in a resource pool configured by the network.

The PSBCH may be a channel for carrying system information and information on synchronization.

The SLSS and PSBCH may be transmitted every 40 milliseconds (ms) within the discovery period.

In another aspect, provided is a terminal. The terminal includes a radio frequency (RF) unit configured to transmit and receive a radio signal and a processor configured to operatively coupled to the RF unit. The processor determines whether the terminal is in or out of cell coverage and determines whether a discovery signal to be transmitted by the terminal is a public safety (PS) discovery signal for PS. In a case that the terminal is outside the cell coverage and is to transmit a PS discovery signal, when a sidelink synchronization signal (SLSS) is transmitted in a discovery period, the PSBCH is also transmitted therewith.

Still another aspect, provided is a method of operating a terminal receiving a device-to-device (D2D) signal in a wireless communication system. The method includes determining the number or priority of sidelink process depending on characteristics of a D2D channel or D2D signal, and receiving the D2D signal through the D2D channel by using the determined number or priority of sidelink process.

The number or priority of the sidelink process may be determined depending on whether the D2D channel or the D2D signal is a D2D channel or a D2D signal based on a synchronization of a serving cell of the terminal.

If the D2D channel or the D2D signal is the D2D channel or the D2D signal based on the synchronization of the serving cell of the terminal, more side link processes or higher priority may be allocated than for a D2D channel or D2D signal which is not based on the synchronization of the serving cell.

The number or priority of the sidelink process may be determined depending on whether the D2D channel or the D2D signal is a D2D channel or a D2D signal associated with a relay terminal performing a relay operation.

If the D2D channel or the D2D signal is a D2D channel or a D2D signal associated with the relay terminal performing the relay operation, more side link processes or higher priorities may be allocated than for a D2D channel or D2D signal which is not associated with the relay terminal.

The number or priority of the sidelink process may be determined depending on whether the D2D channel or the D2D signal has a sidelink signal quality higher than a threshold value.

If the D2D channel or D2D signal has a side link signal quality above the threshold, more side link processes or higher priority may be allocated than for a D2D channel or D2D signal which has not a side link signal quality above the threshold.

Still another aspect, provided is a terminal. The terminal includes a radio frequency (RF) unit configured to transmit and receive a radio signal and a processor configured to operatively coupled to the RF unit. The processor determines the number or priority of sidelink process depending on characteristics of a D2D channel or D2D signal, and receives the D2D signal through the D2D channel by using the determined number or priority of sidelink process.

According to the present invention, a terminal out of cell coverage for transmitting a discovery signal for common security also transmits a PSBCH when transmitting an SLSS. In this case, for example, the terminals out of the cell coverage receive the PSBCH, and thus identify a D2D sub-frame or frame index information, D2D communication-related system bandwidth information, in coverage/out of coverage indication, and TDD configuration information, and the like. In other words, if the terminals out of the cell coverage do not receive the corresponding PSBCH, it is not available to efficiently perform the discovery signal transmission/reception action for common security. According to the present invention, terminals out of the cell coverage can receive necessary information through the PSBCH. Also, since the terminal receiving the D2D signal can allocate the number and priority of a sidelink processes in consideration of the characteristics of the D2D signal, it is available to efficiently process a relatively important (or urgent) or highly reliable D2D signal.

DESCRIPTION OF EXEMPLARY EMBODIMENTS

Figure 1:
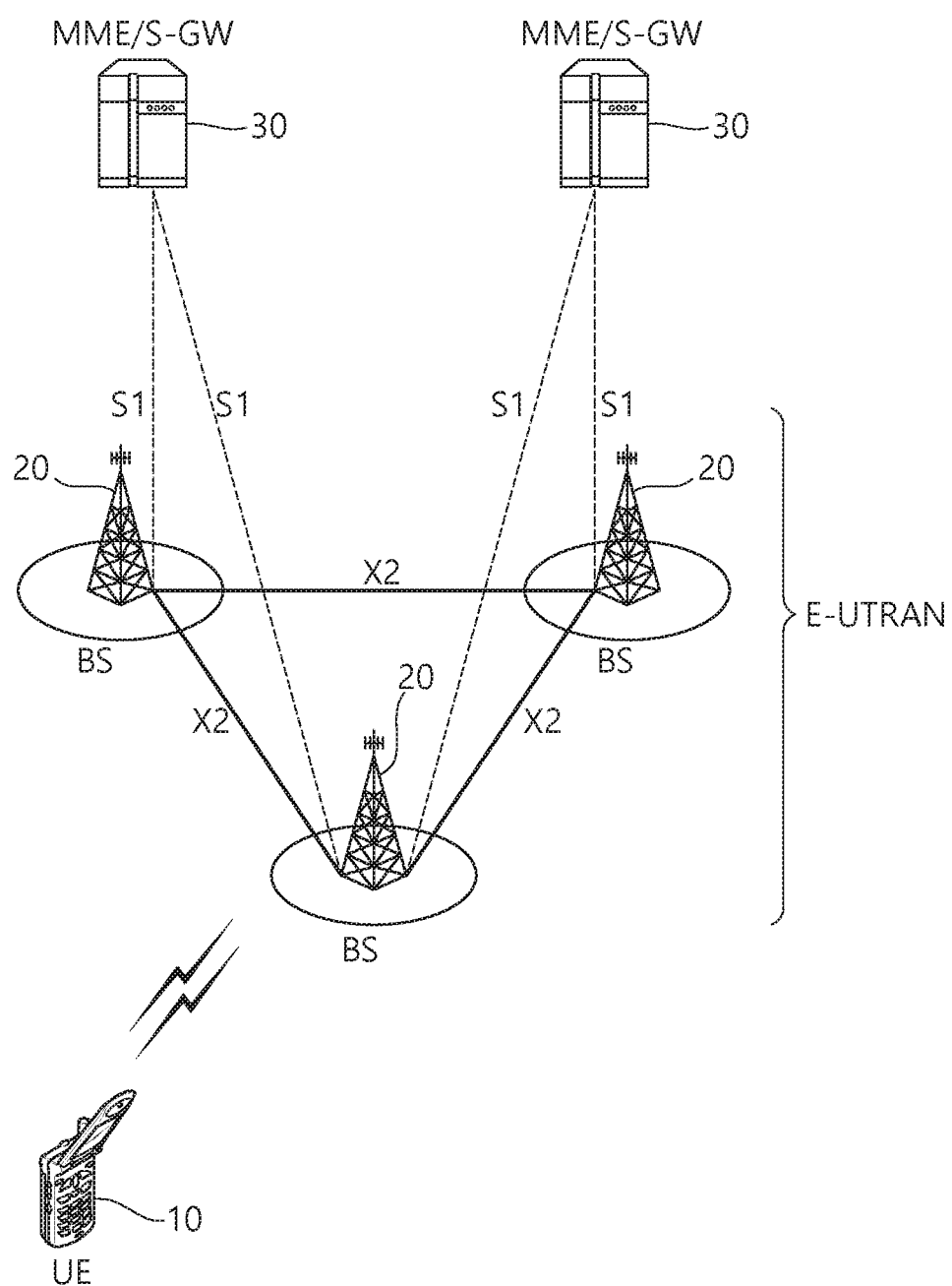
FIG. 1 shows a wireless communication system.

FIG. 1 shows a wireless communication system.

The wireless communication system may be referred to as, for example, Evolved-UMTS Terrestrial Radio Access Network (E-UTRAN) or Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
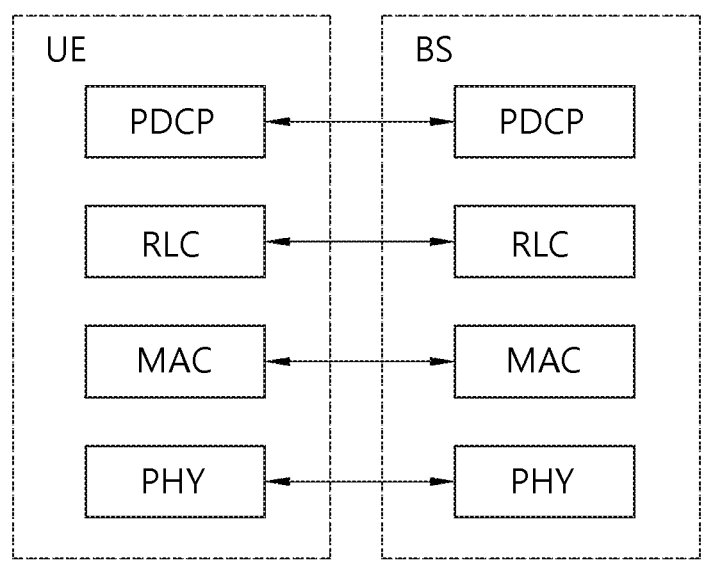
FIG. 2 is a diagram showing a wireless protocol architecture for a user plane.
Figure 3:
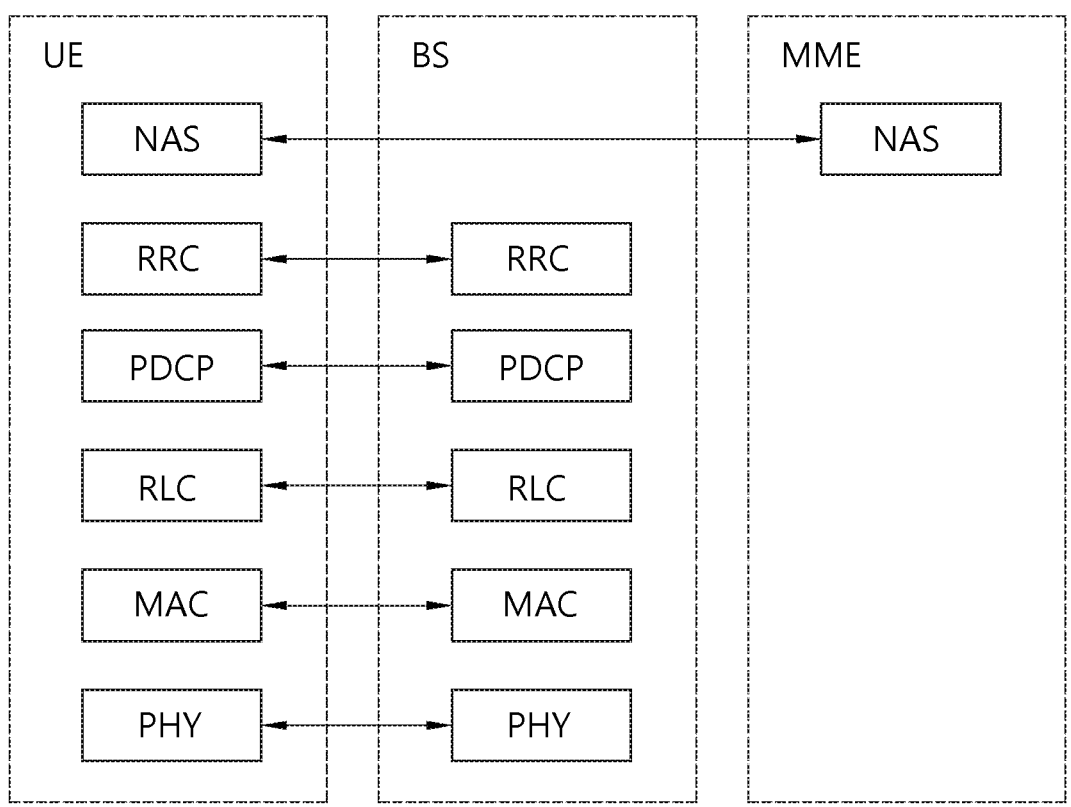
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
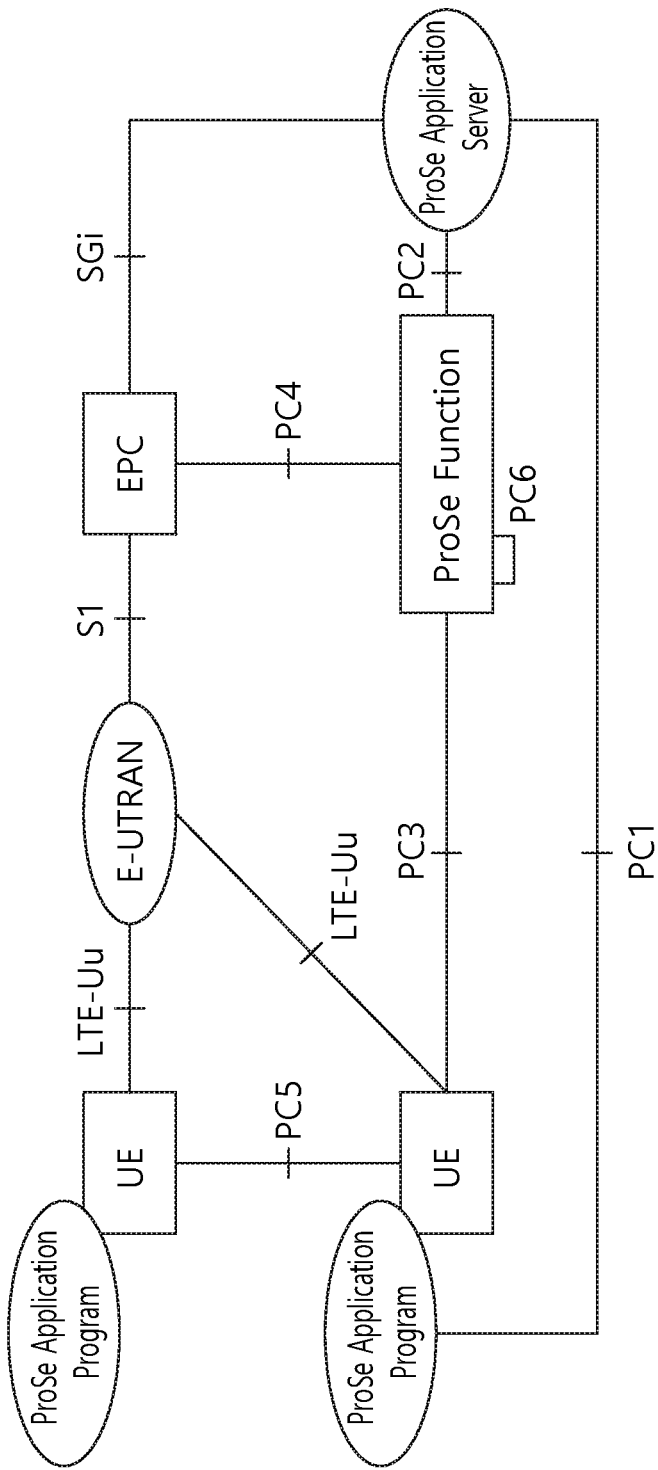
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
  Interworking via a reference point toward the 3rd party applications
  Authorization and configuration of UE for discovery and direct communication
  Enable the functionality of EPC level ProSe discovery
  ProSe related new subscriber data and handling of data storage, and also handling of the ProSe identities
  Security related functionality
  Provide control towards the EPC for policy related functionality
  Provide functionality for charging (via or outside of the EPC, e.g., offline charging)

A reference point and a reference interface in the basic structure for ProSe are described below.
  PC1: a reference point between the ProSe application program within the UE and the ProSe application program within the ProSe APP server. This is used to define signaling requirements in an application dimension.
  PC2: a reference point between the ProSe APP server and the ProSe function. This is used to define an interaction between the ProSe APP server and the ProSe function. The update of application data in the ProSe database of the ProSe function may be an example of the interaction.
  PC3: a reference point between the UE and the ProSe function. This is used to define an interaction between the UE and the ProSe function. A configuration for ProSe discovery and communication may be an example of the interaction.
  PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
  PC5: a reference point used for using control/user plane for discovery and communication, relay, and 1:1 communication between types of UE.
  PC6: a reference point for using a function, such as ProSe discovery, between users belonging to different PLMNs.
  SGi: this may be used to exchange application data and types of application dimension control information.

D2D action (operation) can be supported both when the terminal is serviced within the coverage of the network (cell) and when it is out of coverage of the network.

Figure 5:
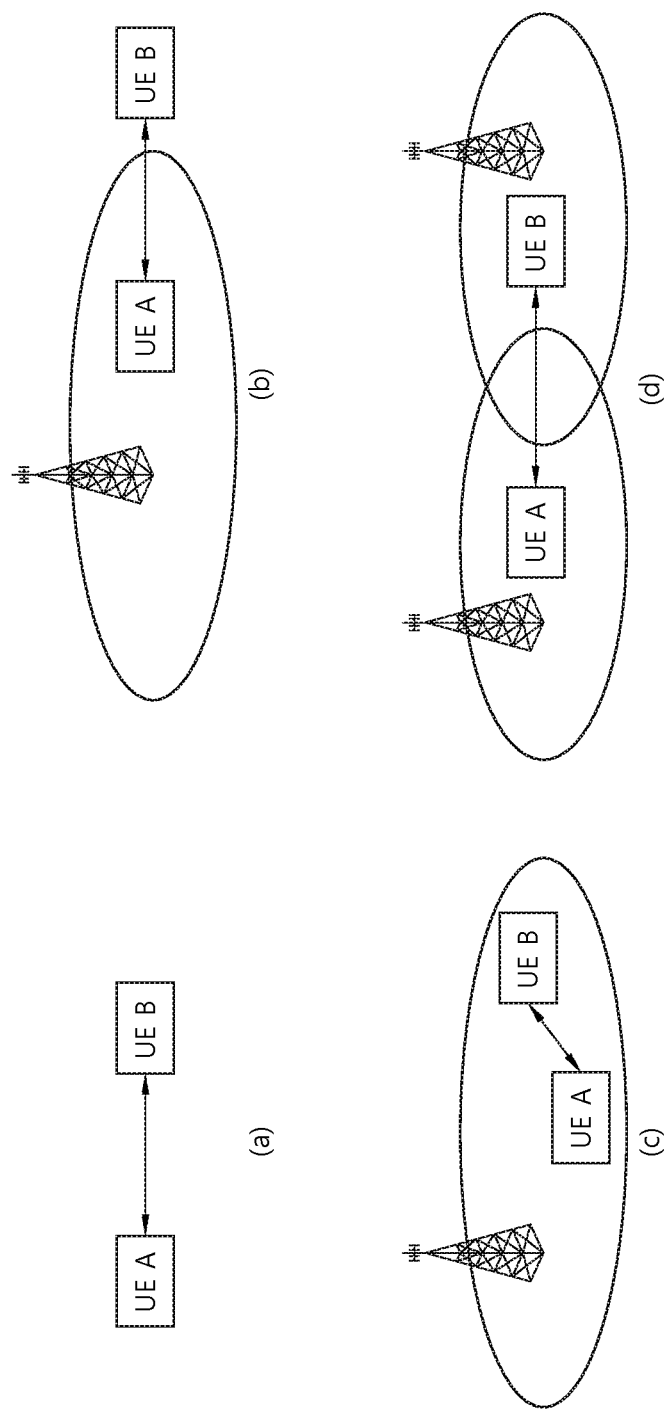
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

D2D action (operation) may be performed between types of UE placed at various positions as in FIG. 5.

<Wireless resource allocation for D2D communication (ProSe direct communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

The D2D discovery refers to the procedure used by a ProSe capable terminal to discover other ProSe capable terminals in close proximity and may be referred to as ProSe direct discovery. The information used for the ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

As a method in which resources for announcement of discovered information are allocated not specifically to a terminal, a base station provides a resource pool configuration for announcement of the discovered information to terminals. The configuration is included in a system information block (SIB) to be signaled by a broadcast scheme. Alternatively, the configuration may be provided while being included in a terminal specific RRC message. Alternatively, the configuration may be broadcast signaling of another layer except for an RRC message or terminal specific signaling.

The terminal autonomously selects the resource from an indicated resource pool and announces the discovery information by using the selected resource. The terminal may announce the discovery information through an arbitrarily selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

For a terminal in the RRC_IDLE state, a base station may 1) inform a SIB of a type 1 resource pool for discovery signal announcement. The terminals that are allowed to directly discover ProSe use the type 1 resource pool for the discovery information announcement in RRC_IDLE state. Alternatively, the base station 2) informs through the SIB that the base station supports ProSe direct discovery but does not provide resources for the discovery information announcement. In this case, the terminal should enter a RRC_CONNECTED state for the discovery information announcement.

For the terminal in the RRC_CONNECTED state, the base station can configure whether to use the type 1 resource pool or the type 2 resource pool for the discovery information announcement through a RRC signal.

Figure 6:
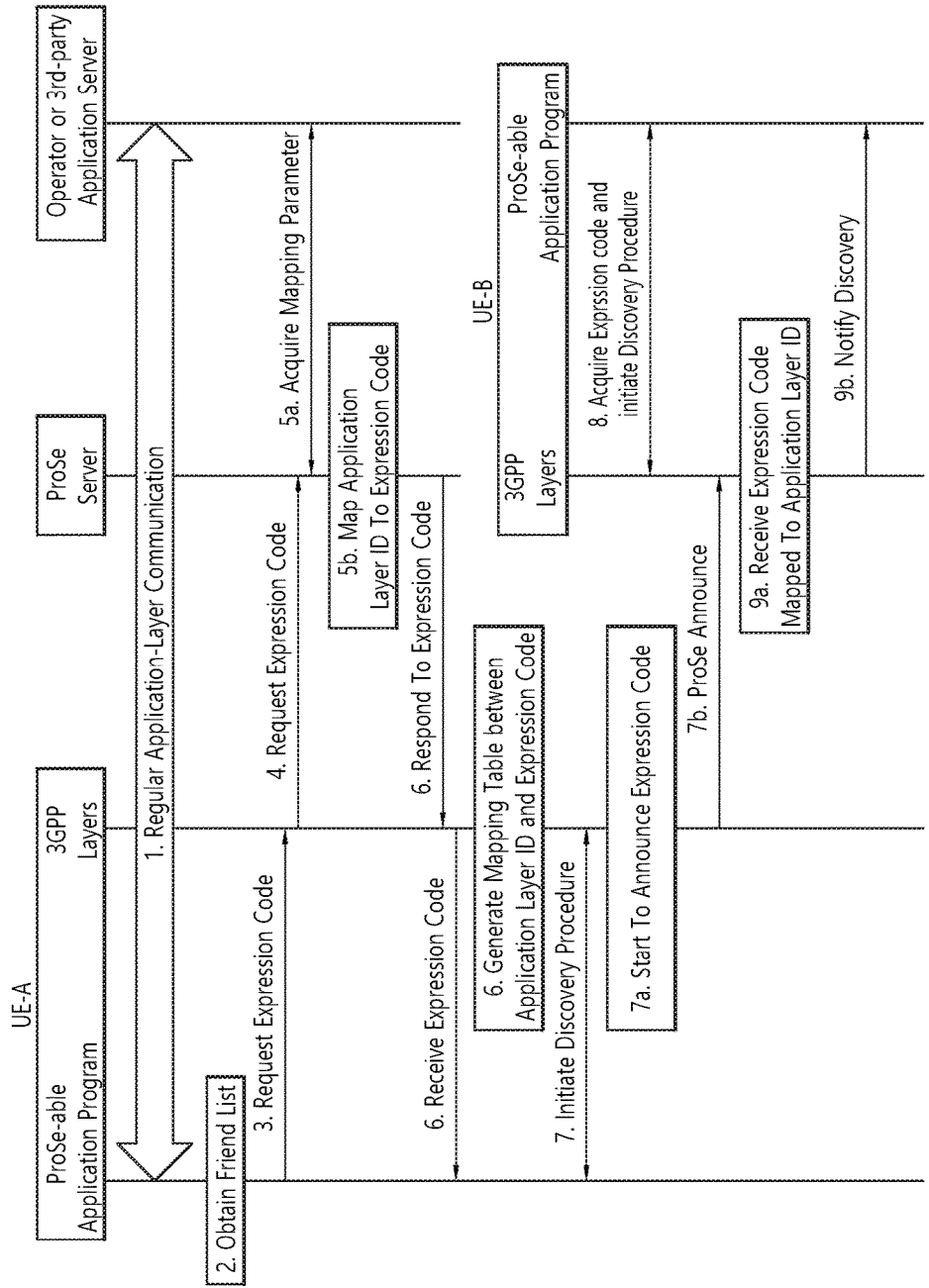
FIG. 6 is an embodiment of a ProSe discovery process.

FIG. 6 is an embodiment of a ProSe discovery process.

Referring to FIG. 6, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$# 2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$# 2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 6, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 6 may also be called a single step discovery procedure.

Figure 7:
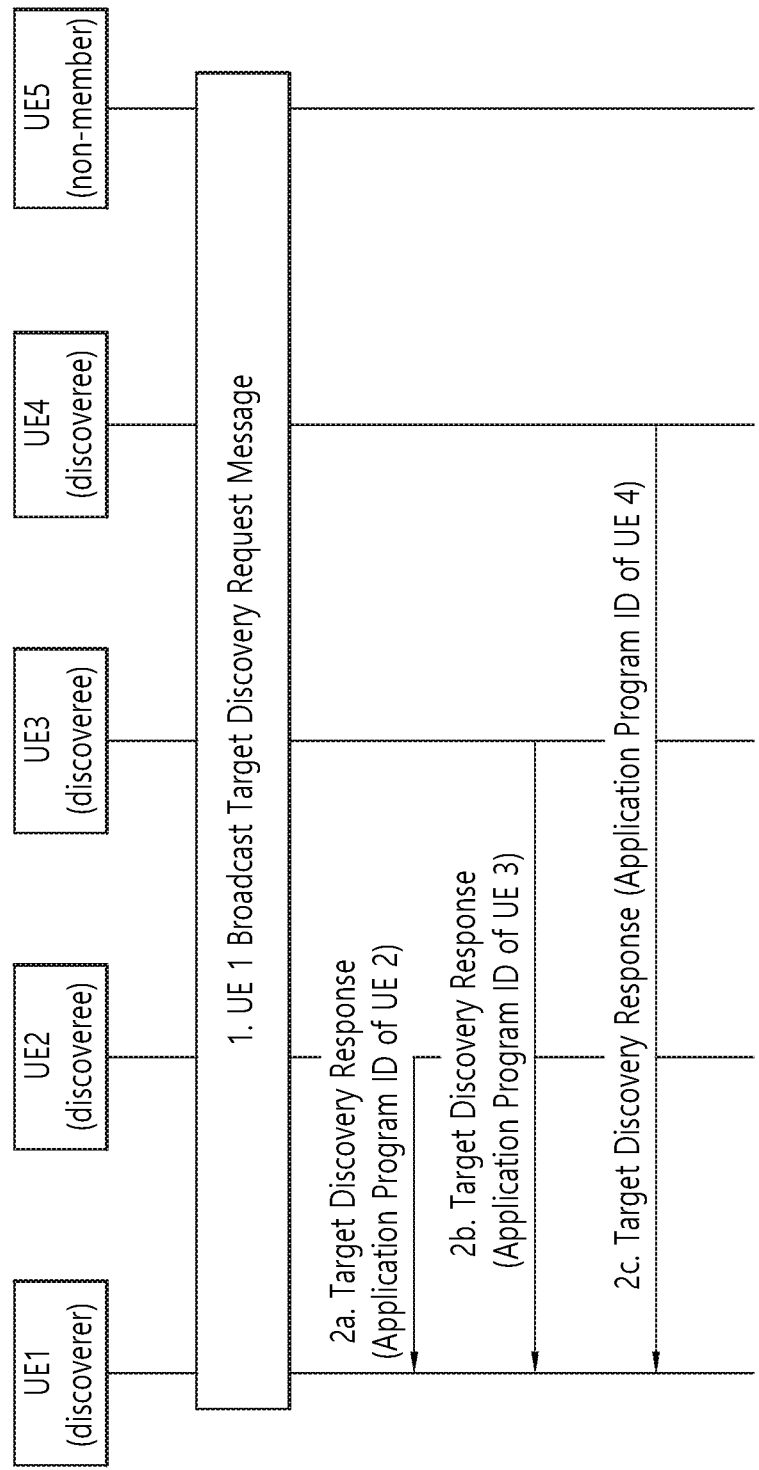
FIG. 7 is another embodiment of a ProSe discovery process.

FIG. 7 is another embodiment of a ProSe discovery process.

In FIG. 7, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 7 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 7 may be called a 2-step discovery procedure.

In addition to the discovery procedure described in FIG. 7, if the UE 1 (the discoverer) sends a discovery conform message (may be hereinafter abbreviated as an M3), that is, a response to the target discovery response message, this may be called a 3-step discovery procedure.

Meanwhile, a terminal supporting the D2D action can provide relay functionality to another network node (e.g., another terminal or a base station).

Figure 8:
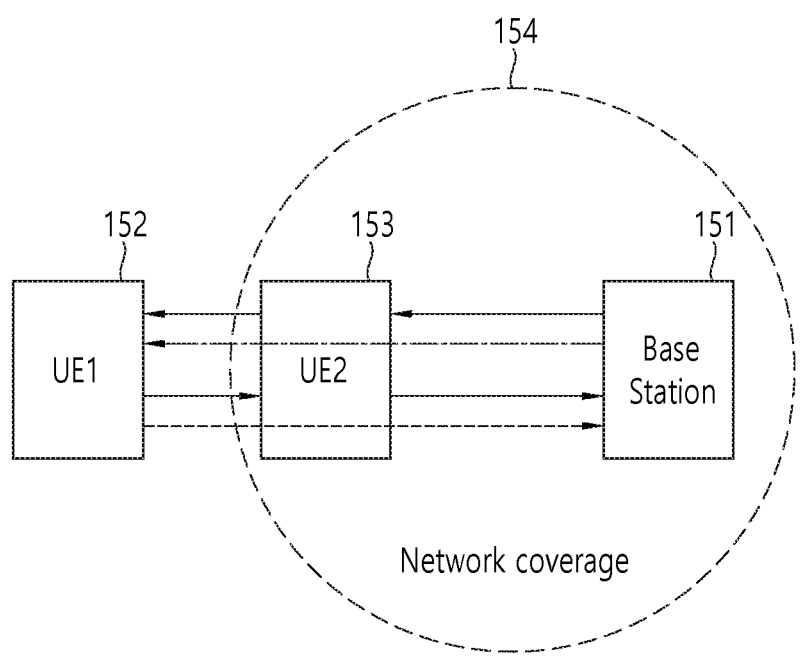
FIG. 8 shows an example of a terminal providing the relay functionality.

FIG. 8 shows an example of a terminal providing the relay functionality.

Referring to FIG. 8, the terminal 2 153 serves as a repeater between the base station 151 and the terminal 1 152. That is, the terminal 2 153 can be regarded as a network node relaying between the terminal 1 152 located out of the coverage 154 of the network and the network 151. The D2D action can be performed between the terminals 1 and 2 152 and 153 and the conventional cellular communication (or wide area network (WAN) communication) can be performed between the terminal 2 153 and the network 151. In FIG. 8, since the terminal 1 152 is located out of the network coverage, it cannot communicate with the network 151 unless the second terminal 153 provides the relay functionality.

The present invention will now be described.

The present invention proposes a method for transmitting a synchronization signal and a broadcast channel by a terminal in order to perform a D2D action. In particular, a method for transmitting the synchronization signal and the broadcast channel for the discovery signal transmission will be described.

More specifically, the present invention relates to a method for efficiently transmitting the synchronization signal and the broadcast channel in the process of transmitting the discovery signal by a first terminal or a second terminal, in a situation where the first terminal is within network coverage, the second terminal is out of network coverage, or a situation where both first and second terminals are out of network coverage, or the like.

Hereinafter, the terminal refers to a user terminal, but when network equipment such as the base station transmits/receives a signal depending on the communication method among the terminals, the network equipment may also be regarded as a terminal.

For convenience of explanation, abbreviations used in the present invention will be described.

The PSBCH (Physical Sidelink Broadcast CHannel) is a physical sidelink broadcast channel. The PSCCH (Physical Sidelink Control CHannel) is a physical sidelink control channel. The PSDCH (Physical Sidelink Discovery CHannel) is a physical sidelink discovery channel. The Physical Sidelink Shared CHannel (PSSCH) is a physical sidelink shared channel. The SLSS (Sidelink Synchronization Signal) is a sidelink synchronization signal. The SLSS includes Primary Sidelink Synchronization Signal (PSSS) and Secondary Sidelink Synchronization Signal (SSSS).

Here, the sidelink means a terminal-to-terminal interface for D2D communication and D2D discovery described above. The sidelink corresponds to the PC5 interface. The D2D communication may be referred to as sidelink communication or simply communication, and the D2D discovery may be referred to as sidelink discovery or simply discovery. The D2D terminal means a terminal performing the D2D action, and the D2D action includes at least one of the D2D communication and the D2D discovery.

Hereinafter, for convenience of explanation, the present invention will be described based on 3GPP LTE/LTE-A system. However, the scope of the system to which the present invention is applied can be extended to other systems beyond the 3GPP LTE/LTE-A system.

When the D2D terminal transmits the discovery signal to the terminal out of the network coverage, it may be desirable to transmit both the SLSS and the PSBCH. If the PSBCH is not received, the terminal out of the network coverage cannot know essential system information for the sidelink and cannot receive the discovery signal properly.

Essential system information for the sidelink may be referred to as the 'MasterInformationBlock-SL,' and the 'MasterInformationBlock-SL,' may include 'InCoverage,' 'sl-Bandwidth,' 'subframeAllocatementSl,' 'directFrameNumber,' 'directSubframeNumber,' and the like. The 'InCoverage' indicates whether the terminal transmitting 'MasterInformationBlock-SL' is within the coverage of the base station. The 'sl-Bandwidth' indicates a transmission band configuration of the side ink. The 'directFrameNumber' indicates the synchronization signal of the sidelink and the frame number at which the broadcast channel is transmitted. The subframe in the frame corresponding to 'directFrameNumber' is indicated by the 'directSubframeNumber'.

<Proposal 1>

When the D2D terminal transmits the discovery signal targeting the terminal out of the network coverage, it may be desirable that both the SLSS and the PSBCH be transmitted. The D2D terminal may be a terminal out of the network coverage or a terminal within the network coverage.

In this case, there will be a problem on which terminal transmits the PSBCH, and one of the following three methods can be used.

The first method is a method, when an arbitrary D2D terminal transmitting the discovery signal transmits the SLSS, of transmitting a PSBCH therewith. According to this method, more opportunities for the terminal out of the network coverage to receive the PSBCH can be provided than those for other methods. However, there may be a disadvantage that LTE-A Rel-12 terminals, which do not necessarily implement this method (these terminals may be terminals that only transmit discovery signals), are forced to transmit the PSBCH together.

The second method is a method of transmitting the PSBCH when the D2D terminal that is capable of supporting the D2D communication and/or desired to transmit the D2D communication transmits the SLSS for the discovery signal.

The second method is advantageous in terms of terminal implementation compared to the first method. This is because the D2D terminal capable of supporting D2D communication and/or attempting to transmit the D2D communication already has ability to transmit the PSBCH.

If the relay action is defined as a separate capability other than the D2D communication and primary reason for transmitting the discovery signal to a terminal out of the network coverage is to discover the relay terminal, it may support the relay action and/or the second method can be determined by transmitting the PSBCH when the D2D terminal to transmit the SLSS for the discovery signal is transmitted.

The third method is to transmit the PSBCH upon transmitting the SLSS, when the D2D terminal transmits a discovery signal (which may be referred to as PS discovery) for public safety (PS).

The discovery signal for common security may have a predetermined format that is predetermined or configured, and the discovery signal of this particular format may cause transmission of the PSBCH.

For example, when transmitting a discovery signal in the public safety (PS) (or NON-PS) discovery signal format, the PSBCH may be transmitted together upon transmitting the SLSS (due to transmission of a PS (or NON-PS) discovery signal). In addition/or when transmitting the PSBCH composed of a specific message # X1 and/or transmitting the SLSS (/PSBCH) based on a specific period (or frequency or frequency) #K1 and transmitting the discovery signal of the NON-PS (or PS) discovery signal format, the PSBCH may not be transmitted upon transmitting the SLSS (due to NON-PS (or PS) discovery signal transmission). In addition/or the SLSS (/PSBCH) based on a certain period (or frequency or number) # K2 may be transmitted and/or the PSBCH comprising a specific message # X2 may be transmitted. In the above example, K1 may be configured to a relatively larger value (or a value equal to or greater than K2).

Figure 9:
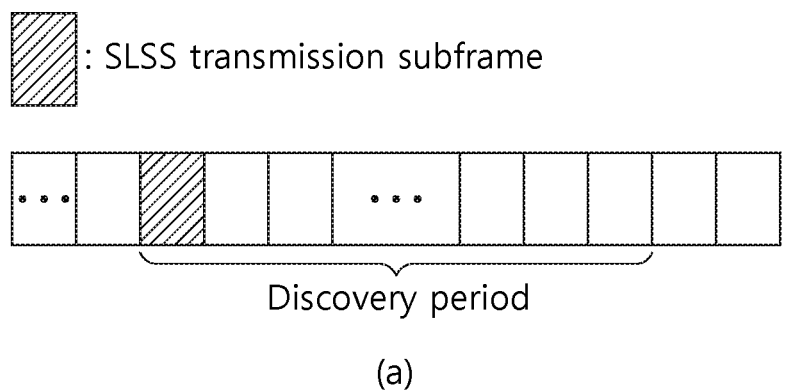
FIG. 9 shows two examples of actions in which a terminal transmits the SLSS and PSBCH.
Figure 9:
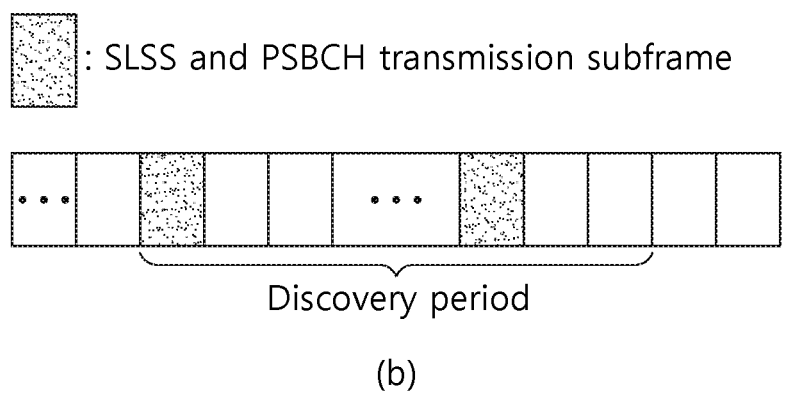

FIG. 9 shows two examples of actions in which a terminal transmits the SLSS and PSBCH.

FIG. 9 (a) shows a first behaviour (behaviour 1). According to behaviour 1, the terminal can transmit the SLSS in a subframe n determined by the LTE-A Rel-12 action (operation). When the terminal is to transmit the discovery signal, it can transmit the discovery signal on a discovered discovery (POOL) period based discovery resource. In this case, for example, if the first subframe of the discovery POOL is a SLSS transmission subframe capable of transmitting the SLSS, the SLSS is transmitted once in this subframe. On the other hand, if the first subframe of the discovery POOL is not a SLSS transmission subframe capable of transmitting SLSS, the SLSS is transmitted once on the SLSS transmission subframe closest to the discovery POOL.

FIG. 9(b) shows a second behavior (behaviour 2) in which the terminal transmits SLSS every 40 ms within the POOL period (having the discovery signal to be received from an upper layer). In this case, the terminal may transmit the PSBCH in the subframe transmitting the SLSS.

In the behaviour 2, if the terminal does not transmit the type 1 discovery message within a given discovery (POOL) period, there will be a problem on whether the terminal should transmit the SLSS. For each discovery resource pool, the Rel-12 terminal can transmit the SLSS only if it actually transmits the discovery signal in the discovery resource pool (or if it has a discovery signal to transmit) (received from an upper layer). In other words, if it is determined that the discovery signal is not transmitted in a certain POOL period based on configured transmission probability p, the SLSS is neither transmitted in the POOL period. The same principle can be applied to the above-described action 2. Then, the Rel-13 terminal can also be prevented unnecessary SLSS transmission and can be prevent from excessive battery consumption.

Figure 10:
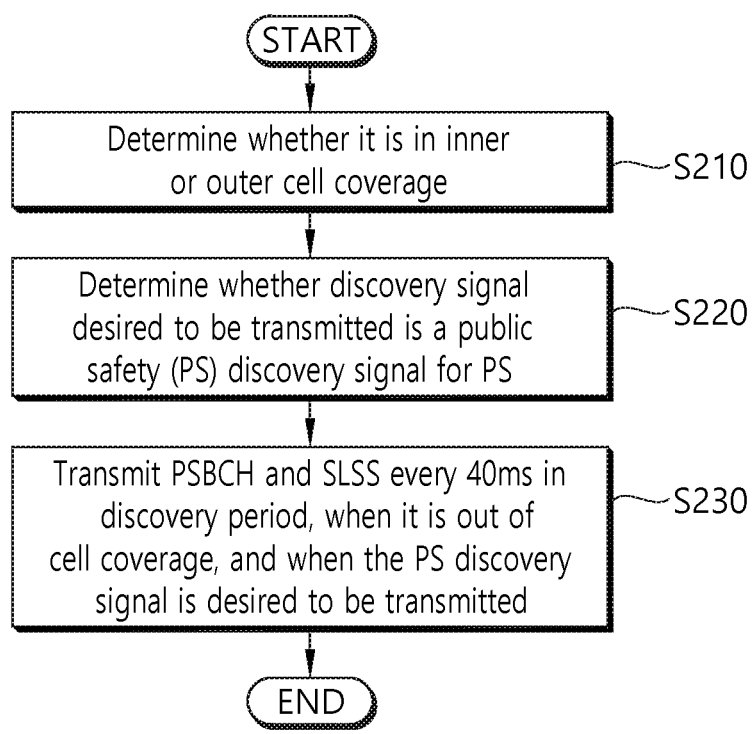
FIG. 10 illustrates a method of transmitting the PSBCH by the terminal according to an embodiment of the present invention.

FIG. 10 illustrates a method of transmitting the PSBCH by the terminal according to an embodiment of the present invention.

Referring to FIG. 10, the terminal determines whether it is in or out of the cell coverage (network coverage) (S210).

The terminal determines whether the discovery signal to be transmitted is the PS discovery signal for public safety (PS) (S220). The PS discovery signal may be the type 1 PS discovery signal. The type 1 is the method in which (every) resource for the discovery signal announcement is allocated in a non-terminal specific manner (from the base station), it means that the base station signals the resource pool configuration for the discovery signal announcement to be included in the system information block (SIB) to the terminals in a broadcasting manner, or provide it to be included in a terminal-specific RRC message, or performing terminal-specific signaling or broadcast signaling of another layer other than the RRC message, and then the terminal selects itself from the designated resource pool and announces (transmits) the discovery signal by using the selected resource.

When the terminal itself is out of the cell coverage and desired to transmit the PS discovery signal, the terminal transmits the PSBCH and SLSS every 40 ms in the discovery (POOL) period (S230). That is, when the terminal out of the cell coverage for transmitting the PS discovery signal transmits the SLSS, the behaviour 2 of the above mentioned behaviour 1 and 2 is followed. The PSBCH carries the system information and information on synchronization.

(Some or all) of the SLSS (/PSBCH) transmission period (or frequency/number of times) and/or on whether the PSBCH is transmitted and/or the PSBCH message contents and the like may be configured differently in the resource pool of the discovery signal. Here, for example, the resource pool of the discovery signal may be a resource pool of the discovery signal for relaying from a terminal to a network, or a resource pool for the discovery signals for group members (or a resource pool for the discovery signals for public safety), or a resource pool of the discovery signal resources for commercial use (or a resource pool of the discovery signal for non-public safety) or the like. This is called option #A.

As another example, a rule may be defined such that a common SLSS (/PSBCH) transmission period (or frequency/number of times) and/or whether the PSBCH is transmitted and/or the PSBCH message contents etc., is to be applied regardless of resource pool type for the discovery signal. This is called option #B.

The base station can inform the D2D terminal through the predefined signaling (for example, SIB, dedicated RRC signal) of which of the option #A, and the option #B is to be applied.

<Proposal 2>

It is confirmed that which terminal of the terminals transmitting the D2D discovery signal needs to transmit the PSBCH. Considering the implementation complexity of the D2D terminal, the following methods can be used.

The D2D terminal capable of performing the D2D communication, and/or intended to transmit the D2D communication may transmit the PSBCH when transmitting the SLSS for the discovery. That is, the D2D terminal which does not intend to transmit the D2D communication does not transmit the PSBCH when transmitting the discovery signal.

Alternatively, when the D2D terminal transmits the discovery signal for public safety (PS), it may transmit the PSBCH when transmitting the SLSS.

In the LTE-A Rel-12, when the SLSS transmission is triggered by discovery, the terminal in the network coverage transmits the SLSS in the first subframe if the first subframe of the resource pool for transmission of the discovery signal is included in the SLSS resource. Or, the SLSS may be transmitted in the last subframe of the SLSS resource, prior to the start point of the resource pool for the discovery signal transmission.

This action is sufficient for a discovery action performed only on 'terminal in network coverage' that can receive information on synchronization from the network. However, the discovery action targeting the terminal out of the network coverage should be different from the discovery action of LTE-A Rel-12 targeting only terminals in network coverage. The SLSS should be received by the terminal out of the network coverage. The terminal out of the network coverage may have a large frequency error and the SLSS detection performance should be reliable under such large frequency error.

Moreover, terminals out of the network coverage can not benefit from the network such as SLSS ID, synchronization reference window. To solve this problem, an improvement can be considered for the SLSS transmission of the terminal in the network coverage.

By applying these methods, faster and more reliable synchronization to terminals out of the network coverage is available.

Option #1 below may also be also applied when the terminal out of the network coverage transmits the SLSS.

Option #1: The D2D terminal may transmit the SLSS in a plurality of SLSS subframes prior to the start of the resource pool for the discovery signal. Here, the SLSS subframe means a subframe configured to transmit SLSS.

Option #2: If the base station instructs the D2D terminal within the network coverage to transmit the SLSS, the D2D terminal may continue to transmit the SLSS until it receives a (dedicated) signal instructing it to stop the SLSS transmission from the base station.

<Proposal 3>

If the SLSS transmission is triggered by the discovery, the following methods may be considered for faster and more reliable synchronization of terminals out of the network coverage.

Option #1: The D2D terminal may transmit SLSS in a plurality of SLSS subframes, prior to the start of the resource pool for the discovery signal.

Option #2: If the base station instructs the D2D terminal within the network coverage to transmit the SLSS, the D2D terminal may continue to transmit the SLSS until it receives a (dedicated) signal from the base station instructing it to stop the SLSS transmission.

Now, when the type 1 discovery signal is used for a public safety (PS) purpose, a method of supporting a plurality of discovery signal formats will be described.

Based on the type 1 discovery signal, the discovery action for a public safety service can be performed.

New discovery signal formats may be needed to support discovery for public safety. The new discovery signal format may additionally include information not included in the LTE-A Rel-12 format. When the type 1 discovery is used for public safety, described is how to support a plurality of discovery signal formats.

Instead of the term maximum number of HARQ processes in the sidelink, the term maximum number of sidelink processes may be used.

The maximum number of sidelink processes is the maximum number of sidelink transmission blocks that the terminal can handle at a given instant.

If the transport block is transmitted to the upper layer or if the number of retransmissions reaches the maximum value and the terminal does not transmit to the upper layer and discards the transport block, it is assumed that the transport block is aborted.

In discovery, on the D2D terminal side receiving the discovery signal, the maximum number of sidelink processes that the D2D terminal is expected to handle is the terminal capability, which is one of {50,400}.

One FFT per carrier can be used to receive these sidelink processes. This does not mean any restrictions on whether the terminal should simultaneously receive two or more carriers.

The maximum number of transport block bits received within one TTI may be configured to 50×232. The maximum value of bits for one sidelink transmission block is 232 bits.

A sidelink process may be defined for each transport block. Thus, any reception requiring separate processing for the transport block should be counted in a separate sidelink process. Individual processing for the transport block includes channel estimation, codeword decoding, and soft combining and the like.

In other words, if the terminal receives two discovery messages in the same time/frequency resource (two PRB pairs in the resource pool), if the reference signals of the two discovery messages are different or the length of the message is different, then the processing corresponds to processing two sidelink processes. This is because the terminal is required to perform separate channel estimation or code word decoding and soft combining as if the two discovery messages were transmitted in separate time/frequency resources. If the two discovery messages use the same reference signal and the message length is the same, then a separate sidelink process is not required and may be treated as one sidelink process.

In summary, receiving two discovery messages with the same reference signal and the same message length in a given resource may be considered to process one sidelink process. As for using a different reference signal in a given resource or receiving two discovery messages with different message lengths, it may be considered to process two sidelink processes.

It is desirable to maintain the same reference signal and the same message length, when the type 1 discovery signal is extended for public safety purposes. Then, the complexity that the terminal has to process in the physical layer is not greatly increased for or is the same as that of the LTE-A Rel. 12, and there may be no influence or may be very limited influence on the standard specification such as the capacity information signaling of the terminal, the maximum value of the number of bits of the transport block, or the like.

If the type 1 discovery signal is to be extended for public safety purposes, the terminal receiving the discovery signal should divide its sidelink process capability for each of the plurality of discovery formats, unless the same reference signal and the same message length are maintained.

For example, the terminal receiving the D2D signal should simultaneously (blind) decode a plurality of predefined discovery formats on a specific time resource (/frequency resource) (or a resource pool) that is (or partially (or completely) overlapped), or may be instructed by the base station to perform such an action. In this case, a rule may be defined such that the terminal equally divides "the maximum number of sidelink processes (per carrier)" supported by the terminal among the plurality of corresponding discovery formats. Alternatively, a rule may be defined such that the maximum number of its sidelink processes (per carrier)" is unequally (allocated/divided on its own (e.g., unequal division related weight/information may be predefined or signaled), depending on a predefined (or signaled) priority for each of the discovery format.

For example, the public safety discovery format may have a relatively higher (or lower) priority than the non-public safety discovery format, or the discovery format for relaying from the terminal to the network may be allocated/configured to have relatively higher (or lower) priority than a group member discovery format, a commercial discovery format, or the non-public safety discovery format. In this case, a rule may be defined so as to allocate/divide, "the maximum number of sidelink processes (per carrier)" of the terminal itself, unequally depending on the priorities of the discovery formats.

Here, for example, for the discovery format with a relatively higher priority, more (or fewer) number of sidelink processes may be allocated thereto.

This method can reuse the discovery process in LTE-A Rel-12. For example, the number of PRB pairs per discovery message, the reference signal, the scrambling sequence, the performance evaluation result, and the terminal performance requirements and the like can be performed in the same manner as in LTE-A Rel-12.

Meanwhile, the discovery message format may be changed within a range that does not affect the complexity of the terminal. For example, it is available to use a CRC mask that is dependent on the discovery message format.

In another example, when the terminal receiving the discovery signal/message is using all of "the maximum number of sidelink processes (per carrier)" (which it can support), if it is required to additionally receive the relatively higher priority discovery format/type, then the relatively lower (lowest) priority discovery format/type related sidelink process (which is currently stored in the buffer) may be (re)used as purposes for receiving the relatively higher priority discovery format/type.

Here, for example, the discovery type priority may be configured such that the relay discovery from the terminal to the network has a higher priority than the group member discovery (and/or the public safety discovery has a higher priority than non-public safety discovery and/or the relay discovery from the terminal to the network (or the group member discovery) has a higher priority than the commercial discovery (or non-public safety discovery).

In summary, when the type 1 discovery is used for the public safety of LTE-A Rel-13, the length of the discovery message and the reference signal sequence may be used in the same manner as LTE-A Rel-12.

If two discovery messages using the same message length and the same reference signal are received from a given resource, then it may be regarded as one sidelink process. If two received messages with different message lengths or different reference signals in a given resource are received, then it may be regarded as two sidelink processes.

For example, the terminal receiving the D2D signal may (re)distribute (reallocate) its own "maximum number of sidelink processes (per carrier)" (this is referred to as "MAX_SLPROCES") (with priority), among the D2D channels/signals, depending on a predefined (or signaled) (partial or all) rules in below.

For example, the following (partial or all) rules may be used to determine whether the conventional specific sidelink process (which is in use) may be (re)used (with priority) for the purpose of receiving an additional (or new) D2D channel/signal, or the like, when a terminal receiving a D2D signal using all of its "MAX_SLPROCESS" receives an additional (or new) D2D channel/signal.

Here, for example, if the conventional specific sidelink process (which is in use) is (re)used (with priority) for the purpose of receiving additional (or new) D2D channels/signals, the bits that are stored associated with the conventional specific sidelink process (which is in use) may be interpreted as being flushed (on a soft buffer).

In addition, for example, the following (partial or all) rules may be defined to apply only to D2D communication (and/or D2D discovery).

In addition, for example, the D2D channel/signal that (re)distributes (or (re)allocates) its own "MAX_SLPROCESS" to the terminal receiving the D2D signal may limited to the predefined (or signaled) D2D channel/signal which have S-RSRP (and/or SLSS quality) equal to or greater than a threshold. The S-RSRP means RSRP on the sidelink.

In addition, for example, the terminal receiving the D2D signal may be interpreted as a terminal performing the D2D (communication/discovery) action, a remote terminal (REMOTE UE) out of the network coverage relaying the (network) data through the relay terminal, or a remote terminal out of the network coverage requesting the relay terminal to relay the (network) data or the like.

In addition, for example, in the present invention, CEILING (X) represents a function for deriving a minimum integer equal to or greater than X, and FLOOR (X) represents a function for deriving a maximum integer less than or equal to X.

Hereinafter, it will be described how a terminal receiving a plurality of D2D channels/signals allocates a higher priority, or allocates more sidelink processes to one of the plurality of D2D channels/signals.

(Rule #1) As an example, a rule may be defined such that relatively more number of sidelink processes (or higher priority) is allocated, by the terminal receiving the D2D signal, to the D2D channel/signal reception (or the serving cell related D2D channel/signal reception) with reference to a synchronization signal of the serving cell.

Figure 11:
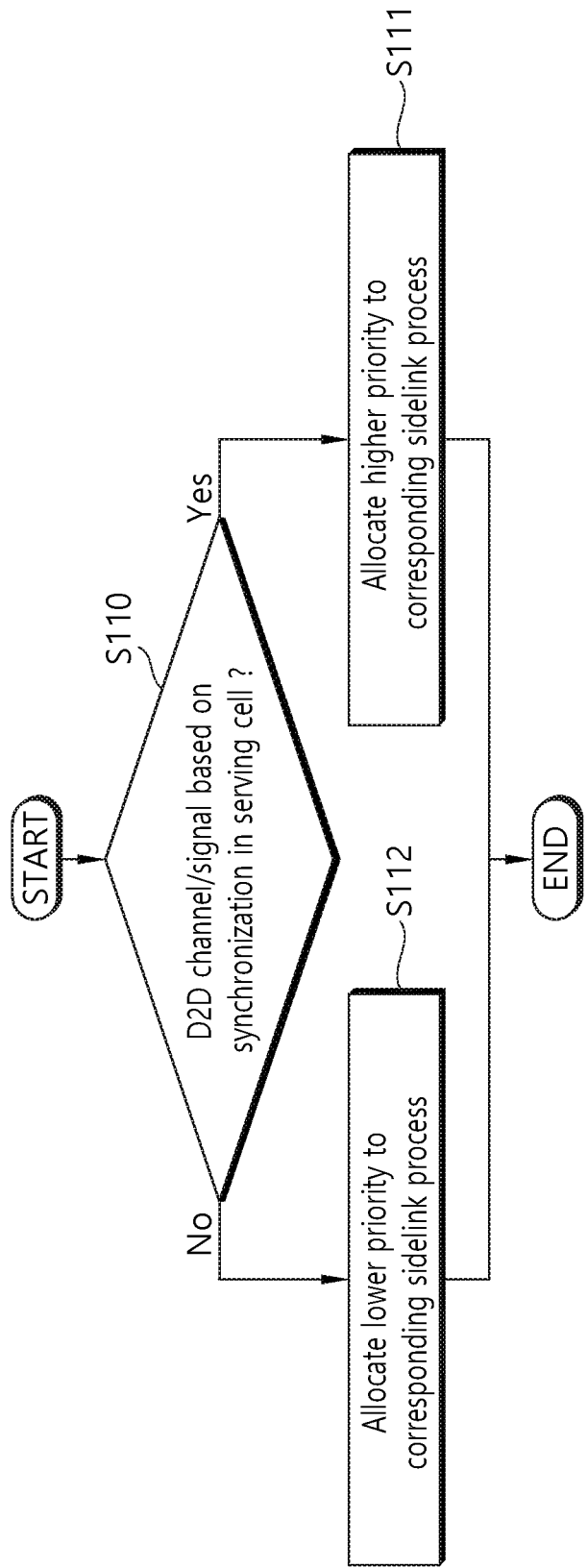
FIG. 11 illustrates the rule #1.

FIG. 11 illustrates the rule #1.

Referring to FIG. 11, the terminal determines whether the received D2D channel/signal is a D2D channel/signal based on the serving cell synchronization (S110), and if so, it allocates a high priority to the corresponding sidelink process (S111). Otherwise, it allocates a low priority (S112). Although FIG. 11 has been described in terms of priority, the same rule may be applied in terms of the number of sidelink processes. That is, it allocates more sidelink processes if the D2D channel/signal is a D2D channel/signal based on serving cell synchronization, and otherwise it allocates fewer sidelink processes.

As a specific example of the case where such a scheme is applied, if a 'terminal receiving a D2D signal' having 16 'MAX_SLPROCESS' should receive both D2D channel/signal #X with reference to or based on the serving cell synchronization and D2D channel/signal #Y based on the non-serving cell synchronization reference, then, 12 sidelink processes may be allocated to the D2D channel/signal #X reception and 4 sidelink processes may be allocated to the D2D channel/signal #Y reception.

Here, for example, the number of sidelink processes allocated to the D2D channel/signal #X reception based on the serving cell synchronization reference or a ratio value or the like between the number of sidelink processes allocated to the D2D channel/signal #X reception based on the serving cell synchronization reference, and the number of sidelink processes allocated to the D2D channel/signal #Y reception based on the non-serving cell synchronization reference, may be informed to the D2D terminal through a predefined signaling (e.g., system information block, (dedicated) RRC signal).

In another example, if the terminal receiving the D2D signal is to receive the D2D channel/signal #X based on a plurality of serving cell synchronization reference, then relatively greater number of sidelink processes (or higher priority) may be allocated to the D2D channel/signal reception associated with the relay terminal. Alternatively, greater number of sidelink processes (or higher priority) may be allocated to the D2D channel/signal reception with relatively higher SLSS quality (or S-RSRP quality) among them.

As another example, it is available to allow the terminal receiving a D2D signal to allocate a greater number of sidelink processes (or higher priority) to the D2D channel/signal reception based on the non-serving cell synchronization reference (or the D2D channel/signal reception associated with the non-serving cell).

(Rule #2) It is available to allow the terminal receiving the D2D signal to allocate a relatively greater number of sidelink processes (or a higher priority) to the D2D channel/signal reception associated with the relay terminal performing the relay action from the terminal to the network may be allocated.

Figure 12:
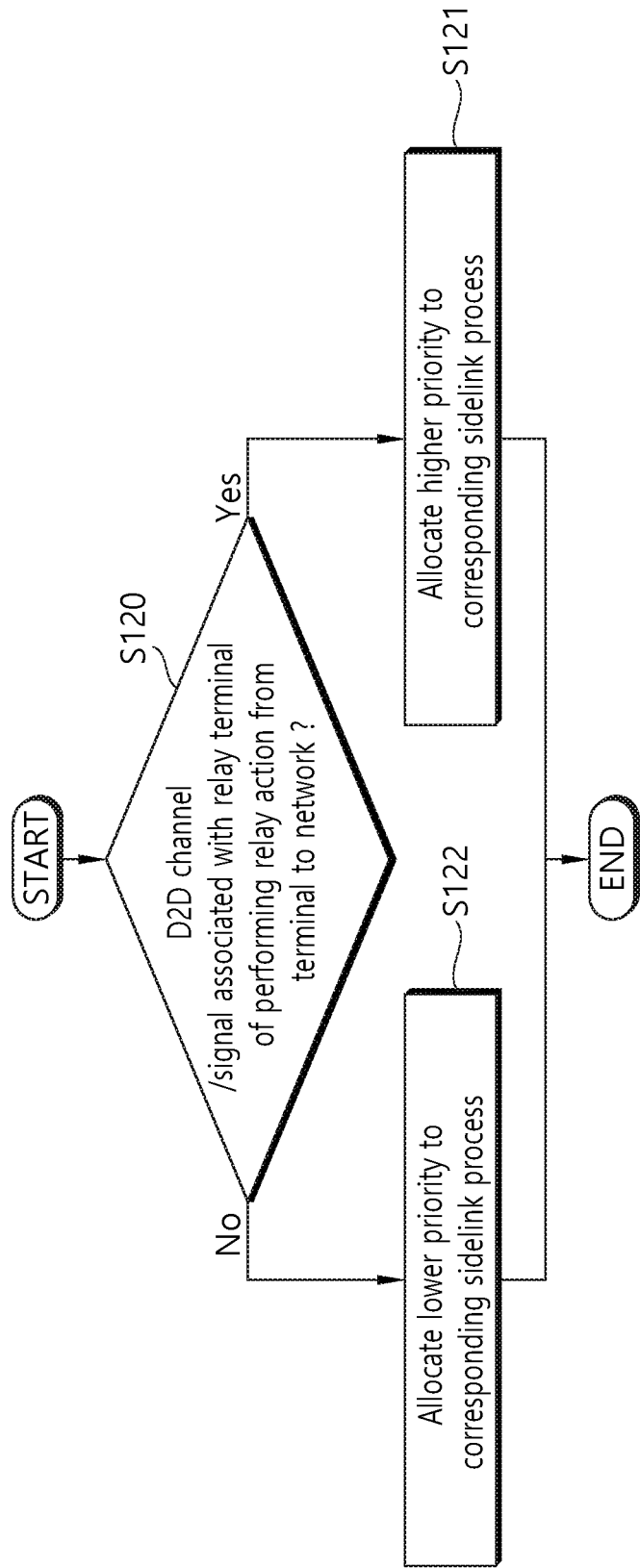
FIG. 12 illustrates the rule #2.

FIG. 12 illustrates the rule #2.

Referring to FIG. 12, it is determined whether the D2D channel/signal is associated with a relay terminal performing a relay action from the terminal to the network (S120). If so, the high priority is allocated to the corresponding sidelink process (S121) and otherwise the low priority is allocated (S122). Although FIG. 12 has been described in terms of priority, the same rule may be applied in terms of the number of sidelink processes. That is, the D2D channel/signal may allocate more sidelink processes if it is a D2D channel/signal associated with the relay terminal, otherwise it may allocate fewer sidelink processes.

As a specific example of the case where such a scheme is applied, if a terminal receiving a D2D signal having 16 & "MAX_SLPROCESS" should receive both the D2D channel/signal #X received from a relay terminal and a D2D channel/signal #Y received from a non-relay terminal (altogether), then 12 sidelink processes for the D2D channel/signal #X reception may be allocated and 4 sidelink processes for the D2D channel/signal #Y reception may be allocated.

Here, for example, the number of sidelink processes allocated to the D2D channel/signal reception associated with the relay terminal or the ratio value and the like between the number of sidelink processes allocated to the D2D channel/signal reception associated with the relay terminal and the number of the sidelink process allocated to the non-relay terminal may be informed to the D2D terminal through predefined signaling (e.g., system information block, (dedicated) RRC signal).

As another example, if the terminal receiving the D2D signal should receive the D2D channel/signal associated with a plurality of relay terminals, then a rule may be defined such that relatively greater number of sidelink processes (or higher priority) is allocated to the D2D channels/signals based on the serving cell synchronization reference, or relatively greater number of sidelink processes (or higher priority) is allocated to the D2D channels/signals with relatively higher SLSS quality (or S-RSRP quality) among them.

As another example, a rule may be defined such that the terminal receiving the D2D signal allocates a relatively greater number of sidelink processes (or higher priority) to the non-relay terminal related D2D channel/signal reception. As another example, a rule may be defined such that the terminal receiving the D2D signal allocates a relatively greater number of sidelink processes (or higher priority) to the existing D2D channel/signal reception based on the SLSS (or synchronization reference) in which its own relay terminal is present. Here, for example, the application of such a rule may be interpreted that the terminal receiving the D2D signal prioritizes the SLSS (or synchronization reference) in which its own relay terminal is present.

As another example, from the viewpoint of the relay terminal, the remote terminal requesting relay to the relay terminal itself may be synchronized with another SLSS (or synchronization reference). Here, for example, another SLSS (or synchronization reference) with which a remote terminal is synchronized may appear as an SLSS of a neighboring cell (or an SLSS having a neighboring cell as a synchronization source). In such a case, for example, a rule may be defined such that a relatively greater number of sidelink processes (or higher priority) is allocated, by the relay terminal, to the D2D channel/signal reception based on the SLSS (or synchronization reference) associated with the remote terminal (being synchronized with another SLSS (or synchronization reference)) requesting relay to the relay terminal itself.

Here, for example, the application of such a rule may be interpreted that the relay terminal prioritizes the SLSS (or synchronization reference) in which the remote terminal requesting the relay is synchronized.

(Rule #3) In one example, a rule may be defined such that the terminal receiving the D2D signal allocates relatively greater number of sidelink processes (or high priority) to the D2D channel/signal reception with relatively higher SLSS quality (or S-RSRP quality).

Figure 13:
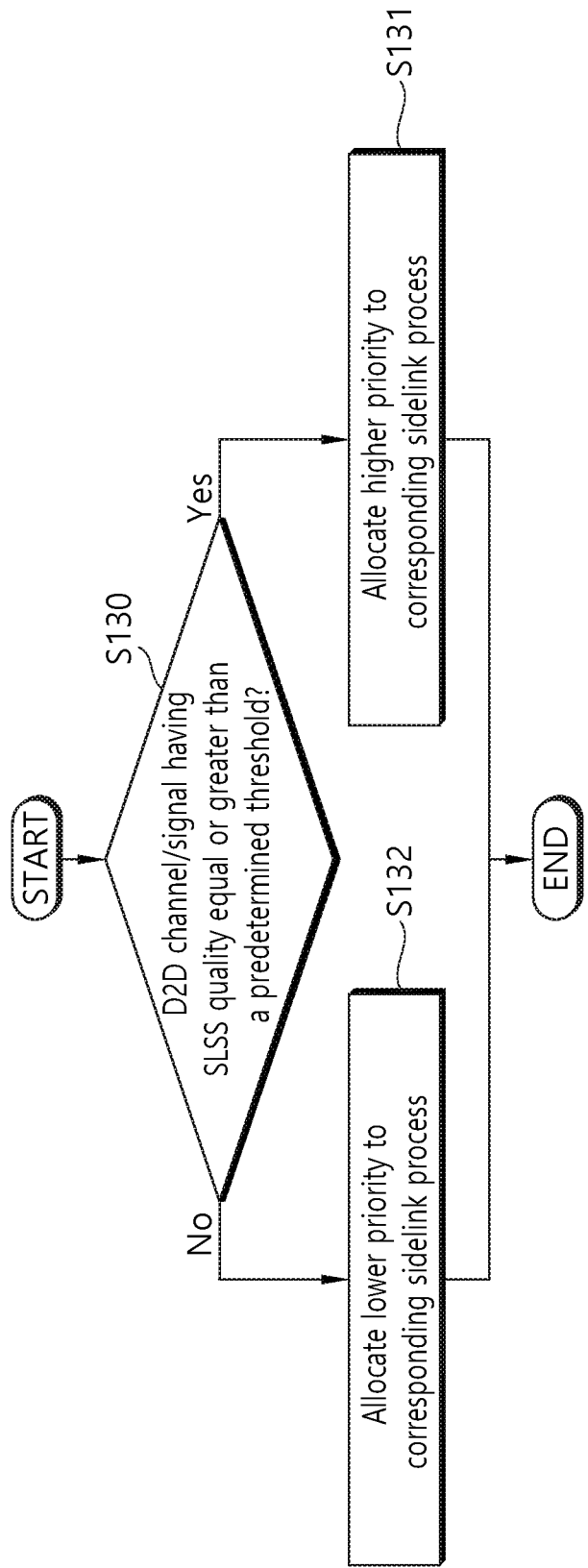
FIG. 13 illustrates the rule #3.

FIG. 13 illustrates the rule #3.

Referring to FIG. 13, it is determined whether the D2D channel/signal having a SLSS quality equal to or higher than a predetermined threshold is received (S130, if so, the high priority is allocated to the corresponding sidelink process (S131), otherwise, the low priority is allocated (S132). Although the SLSS is illustrated in FIG. 13, the same rules may be applied to the S-RSRP.

As a specific example of the case where this proposed scheme is applied, if the relay terminal having 16 "MAX_SLPROCESS" should receive both the D2D channel/signal #X having the SLSS quality (or S-RSRP quality) with M value and the D2D channel/signal #Y having the SLSS quality (or S-RSRP quality) with N value (altogether), and the relationship of 'M>N' is assumed, then 12 sidelink processes may be allocated to the D2D channel/signal #X reception, and 4 sidelink processes may be allocated to the D2D channel/signal #Y reception.

Here, for example, a rule may be defined such that the number of sidelink processes allocated to the D2D channel/signal with a relatively higher SLSS quality (or S-RSRP quality), or the ratio value or the like between the number of sidelink processes allocated to the D2D channel/signal with the relatively higher SLSS quality (or S-RSRP quality) and the number of sidelink processes allocated to D2D channel/signal reception with relatively lower SLSS quality (or S-RSRP quality) may be informed to the D2D terminal through a predefined signaling (e.g., system information block, (dedicated) RRC signal).

For example, in the above-described example, the terminal receiving the D2D signal may use the number 'CEILING (M/(M+N)*MAX_SLPROCESS)' of sidelink process for the D2D channel/signal #X reception, and may use the number '(MAX_SLPROCESS−CEILING(M/(M+N)*MAX_SLPROCESS))' of sidelink processes for the D2D channel/signal #Y reception. Alternatively, the number 'FLOOR (M/(M+N)*MAX_SLPROCESS)' of sidelink process may be used for the D2D channel/signal #X reception, and the number '(MAX_SLPROCESS−FLOOR(M/(M+N)*MAX_SLPROCESS))' of sidelink processes may be used for receiving the D2D channel/signal #Y.

As a specific example of the case where the proposed scheme is applied, if the 'terminal receiving the D2D signal' having 16 "MAX_SLPROCESS" should receive both the D2D channel/signal #X having the SLSS quality (or S-RSRP quality) with M value and the D2D channel/signal #Y having the SLSS quality (or S-RSRP quality) with an N value (altogether) and a relation of 'M=N' or 'M-OFFSET≤N≤M+OFFSET' is assumed (where OFFSET represents a predefined (or signaled) (permissive) value), then 8 sidelink processes may be allocated to the D2D channel/signal #X reception and 8 sidelink processes may be allocated to the D2D channel/signal # Y reception, As another example, if a terminal receiving the D2D signal should receive a plurality of D2D channels/signals S having the same SLSS quality (or S-RSRP quality), then a relatively greater number of sidelink processes (or higher priority) may be allocated to the D2D channel/signal reception based on the serving cell synchronization reference among them. Alternatively, a relatively greater number of sidelink processes (or higher priority) may be allocated to the D2D channel/signal reception associated with the relay terminal among them.

In another example, a rule may be defined such that a terminal receiving a D2D signal allocates a relatively greater number of sidelink processes (or a higher priority) to the D2D channel/signal reception with a relatively lower SLSS quality (or S-RSRP quality).

On the other hand, the methods described in FIGS. 11 to 13 may be used in combination with each other. That is, the terminal determines in combination of at least one of whether it is a D2D channel/signal based on the synchronization of the serving cell, whether it is a D2D channel/signal associated with the relay terminal, whether the SLSS quality is equal to or greater than a certain threshold, or the like, and then the number or priority of sidelink processes may be allocated depending on the determination.

As another example, if the relay terminal performs reception on the D2D resource pool of the neighboring cell, then the serving cell (of the relay terminal) should not schedule the WAN uplink transmission (to the relay terminal) in the corresponding (neighbor cell) D2D resource pool interval. However, if the serving cell is not in synchronized (in time/frequency) between the serving cell and the neighboring cell, then the serving cell should configure a relatively long interval as a (uplink) gap (i.e. interval in which the WAN uplink transmission is not performed), to support (/guarantee) the receiving action on the D2D resource pool of the neighboring cell of the relay terminal. In this case, for example, the WAN uplink transmission opportunity/performance reduction (associated with the serving cell) is increased, because the serving cell should configure the relatively longer interval as the (uplink) gap.

In order to solve such a problem, for example, when the serving cell of the relay terminal should be able to identify a cell (e.g., cell A) with which the remote terminal is synchronized (in time/frequency), in which services are provided by the corresponding relay terminal. In this way, the serving cell of the relay terminal may determine whether to configure the (uplink) gap in consideration of the D2D resource pool of the cell A (e.g., the resource pool in which the remote terminal performs D2D transmission), or may effectively configure the (uplink) gap by accurately identifying position of the D2D resource pool of the cell A.

Here, for example, information on a cell synchronized with which the remote terminal is synchronized (in time/ frequency) (e.g., SLSS ID (physical layer sidelink synchronization ID), cell ID) and/or time (/frequency) synchronization information of the neighboring cell (or time (/frequency) synchronization difference information between the neighboring cell and the serving cell) or the like may be identified by the relay terminal and reported to its serving cell (through a predefined signal/channel).

As another example, a method of supporting (transmission/reception) action of type 1 discovery signal (and/or (the type 1 discovery) SLSS transmission/reception action) will be described. The method may be applied to transmission of the discovery signal for the case where a first terminal is in the network coverage and a second terminal is out of the network coverage (it is referred to as the case for a partial network coverage), and where the first and second terminals are both out of the network coverage (it is referred to as the case for an out of network coverage).

In the case of partial network coverage and out of network coverage, in transmitting the discovery signal, the PSDCH transmission is supported when the PSDCH resource is configured or predetermined. The resource pool parameters associated with the discovery signal out of the network coverage may be predetermined.

The transport block size on the PSDCH may be a total of 232 bits, including 24 CRC bits. This transport block size may be the same either in or out of the network coverage.

When a terminal operated by LTE-A Rel. 13 transmits the type 1 discovery signal, it may also transmit the SLSS. In this case, the SLSS may be transmitted by one of the above-described behavior 1 and behavior 2.

For each discovery resource pool, when the terminal in the network coverage transmits the discovery signal, if the first subframe of the discovery resource pool is included in the D2DSS (SLSS) resource for transmitting the D2DSS (SLSS), then the terminal transmits the D2DSS (SLSS) in the first subframe of the discovery resource pool.

Otherwise, the D2DSS (SLSS) is transmitted in the last (most recent) subframe of the D2DSS (SLSS) resource positioned prior to, with reference to the start point of the discovery resource pool. In this case, the last subframe should not collide with the cellular communication with respect to the terminal, and may not scan another D2DSS (SLSS) in the last subframe. In addition, the discovery message should be transmitted in the last subframe. In addition, the terminal should be in the RRC connection state and the base station has been in a state that it instructed the terminal to start the D2DSS (SLSS) transmission. Alternatively, all of the following conditions should be met:

An RSRP threshold is configured for the D2DSS (SLSS) transmission in discovery, and the threshold may be configured through the SIB. The threshold may be configured as {−infinity, −115, . . . , −60, +infinity} dBm and may be increased by 5 units. Also, the RSRP value of the terminal should be smaller than the threshold value and the base station should not instruct the D2DSS (SLSS) transmission to be stopped.

For the type 1 discovery, for each discovery period, the terminal may transmit the discovery signal at randomly selected discovery resources based on transmission probability p. The transmission probability p may be configured as a part of each type 1 discovery resource pool and does not consider resources that can not be used. P is a value between 0 and 1, for example, it is configured as p={0.25, 0.5, 0.75, 1}. For each discovery period, the configuration is applied to both the initial transmission and any retransmission of the discovery signal.

In the second action, the Rel-13 terminal transmitting the discovery signal actually transmits the SLSS every 40 ms within each discovery period transmitting the type 1 discovery message.

It may be a problem when the Rel-13 terminal follows the above described first or second action. In the case of a terminal in network coverage, it is available to indicate through the predetermined signaling whether the base station follows either the first action or the second action.

For example, the corresponding signaling may be defined (or inserted) (with additional fields) or may be defined as an (independent) RRC signal on the discovery (transmission) resource configuration (or SLSS (transmission) resource configuration).

In the second action described above, two SLSS transmission triggering mechanisms (using RSRP threshold and configured through the dedicated signal) at Rel-12 may be reused. In particular, if the SLSS transmissions are triggered by either one, then the Rel-13 terminal may transmit the SLSS every 40 ms at each discovery period that can transmit the type 1 discovery signal.

As another example, when a terminal receives a predefined dedicated signal (from a base station), the corresponding terminal may transmit the SLSS for the discovery signal every 40 ms, regardless of whether the discovery signal is actually transmitted or not (whether it has a discovery message to transmit or not).

As another example, when the proposed schemes are applied, if the terminal does not receive the dedicated signaling (or if the dedicated signal field is not configured), then the rule may be defined to perform the SLSS transmission action based on the RSRP threshold (by default).

For the Rel-13 terminals out of the network coverage, the second action may be defined as the default action. This is because the second action provides more opportunity to transmit the SLSS compared to the first action. Here, relatively more frequent SLSS transmissions provide reliable SLSS discovery performance. Alternatively, the type 1 discovery signal transmission probability p may be configured to 1 to provide reliable SLSS detection performance.

As another example, it may be informed to the terminal out of the network coverage whether to apply any of the first action or the second action described above out of the network coverage, through a predetermined new field (or indicator).

When the Rel-13 terminal in the network coverage transmits a discovery signal, the base station may instruct the terminal to apply either the first action or the second action described above through predetermined signaling. In the second action, two SLSS transmission triggering mechanisms (using the RSRP threshold and configured through the dedicated signal) at Rel-12 may be reused. The second action may be defined as the default action.

In a second action, it may be a question whether the reserved bits of the PSBCH are used. Since the number of reserved bits is limited, it is desirable to be used for essential synchronization purposes. Other information, such as resource information of the relay terminal, may be communicated through the discovery message.

Through the following (partial or all) proposed methods, the D2D synchronization signal can be efficiently transmitted.

(Example #A) When the D2D terminal performs the D2D discovery/communication transmission on a preconfigured carrier #Y, if (at least one) (serving) cell satisfying the S-criterion on the corresponding carrier #Y is existed (/detected), then a synchronization and/or the DL measurement of the carrier #Z configured (or signaled) by the network (or base station) may be used for the D2D discovery/communication transmission on the carrier #Y.

(Example #B) When the D2D terminal performs the D2D discovery/communication transmission on the preconfigured carrier #Y, if (at least one) (serving) cell satisfying the predefined (signaled) condition (e.g., S-criterion) on the corresponding carrier #Y is not existed (/detected), then the reference carrier information configured (or signaled) by the network (or base station) may be assumed as a misconfiguration, the D2D discovery/communication transmission on the corresponding carrier #Y may be performed depending on an out of network coverage based synchronization and/or a (downlink) measurement procedure.

(Example #C) If the D2D terminal is in a (serving) cell on the reference carrier #X configured (/signaled) by the network (or the base station) (i.e., the reference carrier associated with the D2D discovery/communication transmission on the carrier #Y), then the D2D discovery/communication transmission on the carrier #Y follows the corresponding (serving) cell based synchronization and/or downlink measurements.

Figure 14:
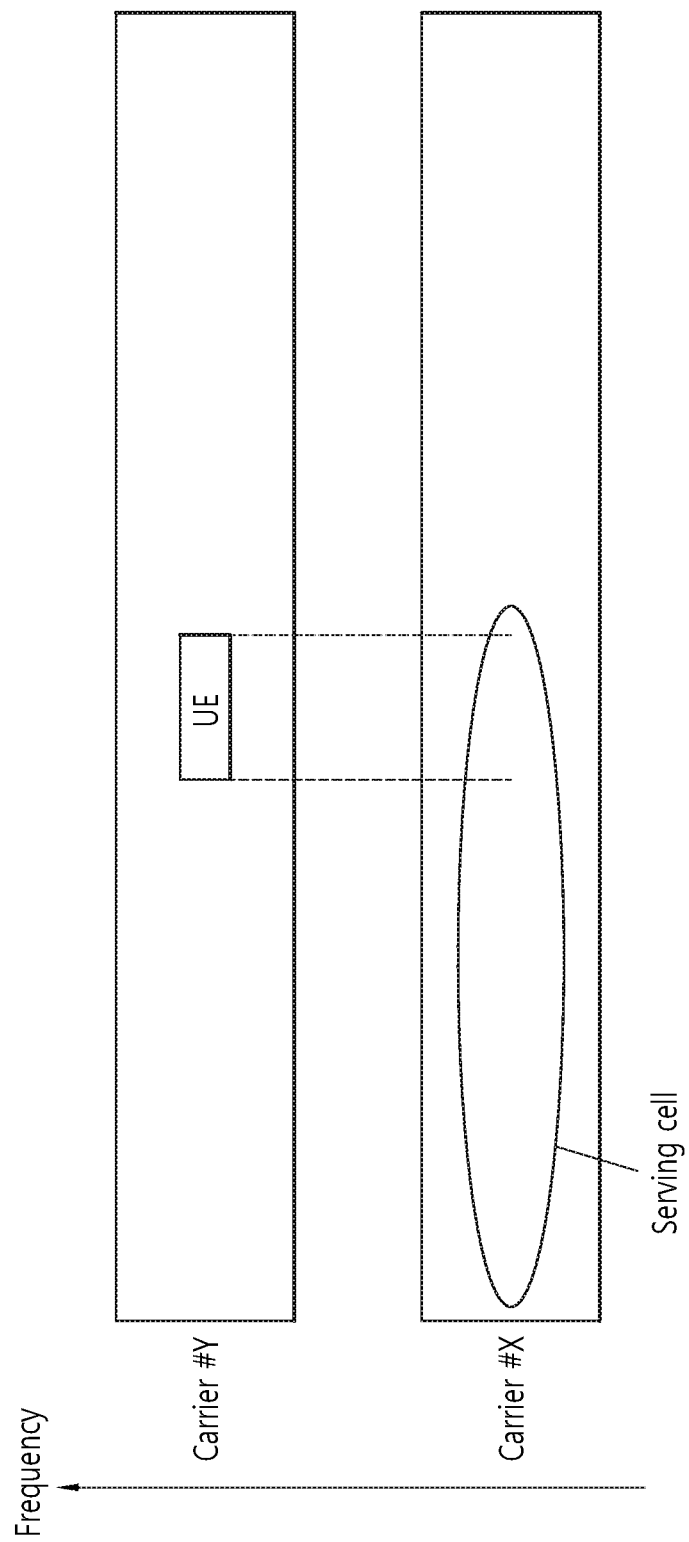
FIG. 14 shows an example in which the terminal performs the D2D action on a carrier wave other than a serving carrier wave.

FIG. 14 shows an example in which the terminal performs the D2D action on a carrier wave other than a serving carrier wave.

Referring to FIG. 14, the carrier #X may be a primary carrier as the serving carrier of the terminal (UE). The carrier #Y may be a carrier on which the terminal is interested in performing a D2D action, e.g., a D2D discovery action. The carrier #Y is a carrier different from the carrier #X.

In this case, if the terminal has the activated serving cell on the carrier #Y, the terminal uses the active serving cell of the carrier #Y for downlink measurement and synchronization necessary for the D2D action. For example, a reference signal may be received from the active serving cell of the terminal on the carrier #Y to perform downlink measurement and receive a synchronization signal from the activated serving cell to synchronize.

It would be a problem when the terminal does not have the activated serving cell on the carrier #Y.

Figure 15:
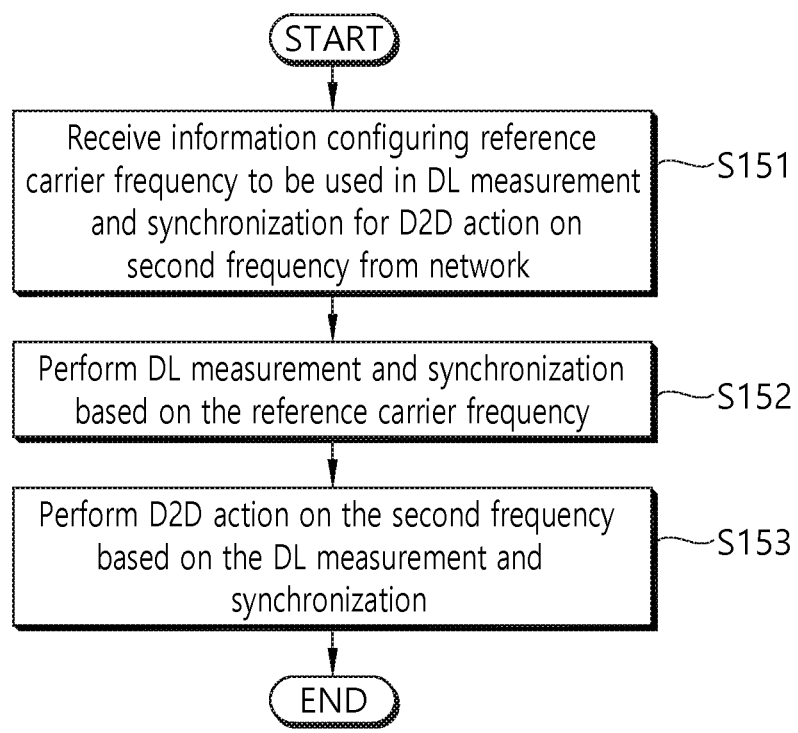
FIG. 15 shows a method of operating by a terminal to perform a D2D action on a second carrier other than a first carrier wave which is a primary carrier.

FIG. 15 shows a method of operating by a terminal to perform a D2D action on a second carrier other than a first carrier wave which is a primary carrier.

Referring to FIG. 15, information is received for configuring a reference carrier to be used for downlink measurement and synchronization for D2D action on the second carrier from the network (S151). The D2D action may be transmission of the D2D signal, in terms of signal transmission/reception.

The reference carrier may be a downlink carrier that is paired with the second carrier. Alternatively, the reference carrier may be a downlink carrier that is not paired with the second carrier.

The terminal performs downlink measurement and synchronization based on the reference carrier (S152). That is, the terminal actually performs the D2D action on the second carrier, but the downlink measurement and synchronization for the D2D action is performed based on the reference carrier configured by the network other than the second carrier.

The terminal performs the D2D action on the second carrier based on the downlink measurement and synchronization (S153).

If there is no (serving) cell on the reference carrier #X configured (/signaled) by the network (or base station), then the best cell on the reference carrier #X based on a predefined rule, e.g., (serving) cell with the highest RSRP, is selected, and then the D2D discovery/communication transmission on the carrier #Y may follow the best (serving) cell based synchronization and/or (downlink) measurements.

It is obvious that examples of the proposed scheme described above may also be implemented as one of the implementation methods of the present invention, and thus may be regarded as a kind of proposed schemes. Also, the proposed schemes described above may be implemented independently or in combination (or corporation) of some of the proposed schemes. For the proposed schemes described above, a rule may be defined such that they are limitedly applied only in the FDD system (and/or TDD system) environment. The proposed schemes described above may be defined such that they are limitedly applied only to MODE 2 communication and/or TYPE 1 discovery (and/or MODE 1 communication and/or TYPE 2 discovery). In addition, a rule may be defined such that the proposed schemes described above is limitedly applied to only a D2D terminal in the network coverage and/or a D2D terminal out of the network coverage and/or a D2D terminal in the RRC_connected state and/or a D2D terminal in the RRC_idle state and/or a relay terminal (and/or a remote terminal (participating in a relay communication)). In addition, a rule may be defined such that the above-described proposed schemes are limitedly applied only to the D2D terminal performing only the D2D discovery (transmission (/reception)) action (and/or the D2D terminal performing only the D2D communication (transmission (/reception) action). A rule may be defined such that the proposed schemes described above are limitedly applied to only the scenario where only the D2D discovery is supported (configured) (and/or only the scenario where only the D2D communication is supported (configured)). A rule may be defined such that the proposed schemes described above are limitedly applied to only the case where the D2D discovery signal reception action is performed on the different (uplink) carrier on the different frequency (INTER-FREQUENCY) (and/or the case where the D2D discovery signal reception action is performed on the other PLMN (uplink) carrier based on the INTER-PLMN).

Figure 16:
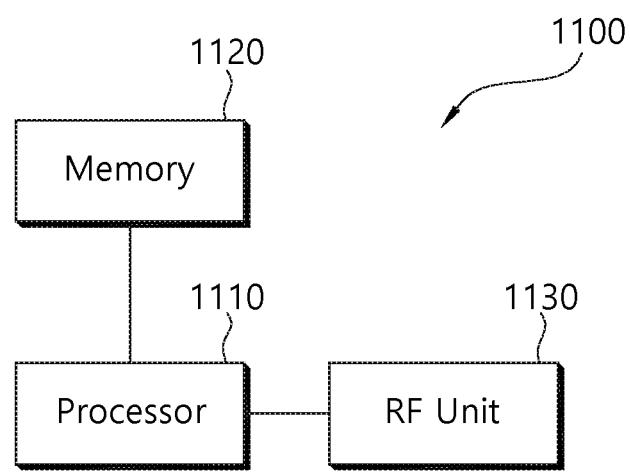
FIG. 16 is a block diagram showing a terminal in which an embodiment of the present invention is implemented.

FIG. 16 is a block diagram showing a terminal in which an embodiment of the present invention is implemented.

Referring to FIG. 16, a terminal 1100 includes a processor 1110, a memory 1120, and a radio frequency (RF) unit 1130. The processor 1110 implements the proposed functionality, process and/or method.

The RF unit 1130 is coupled to the processor 1110 to transmit and receive radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for transmitting a physical sidelink broadcast channel (PSBCH) in a wireless communication system, the method performed by a terminal and comprising:
generating a sidelink synchronization signal (SLSS); and
transmitting the SLSS in a subframe,
wherein when the terminal is outside a cell coverage and is to transmit a public safety (PS) discovery signal, the terminal transmits the PSBCH in the subframe.

2. The method of claim 1, wherein the PS discovery signal includes a type 1 discovery signal transmitted by using a resource selected by the terminal itself in a resource pool configured by the network.

3. The method of claim 1, wherein the PSBCH is a channel for carrying system information and information on synchronization.

4. The method of claim 1, wherein the SLSS and PSBCH are transmitted every 40 milliseconds (ms) within a discovery period.

5. A terminal, comprising:
a transceiver configured to transmit and receive a radio signal; and
a processor configured to operatively coupled to the transceiver,
wherein the processor generates a sidelink synchronization signal (SLSS), and transmits the SLSS in a subframe, when
the terminal is outside a cell coverage and is to transmit a public safety (PS) discovery signal, the terminal transmits the PSBCH in the subframe.

6. The terminal of claim 5, wherein the PS discovery signal includes a type 1 discovery signal transmitted by using a resource selected by the terminal itself in a resource pool configured by the network.

7. The terminal of claim 5, wherein the PSBCH is a channel for carrying system information and information on synchronization.

8. The terminal of claim 5, wherein the SLSS and PSBCH are transmitted every 40 milliseconds (ms) within a discovery period.

* * * * *